Feb. 23, 1937.   L. C. FRANK   2,071,826
BATTERY CHARGE CONTROL FOR SMALL POWER PLANTS
Filed June 14, 1934
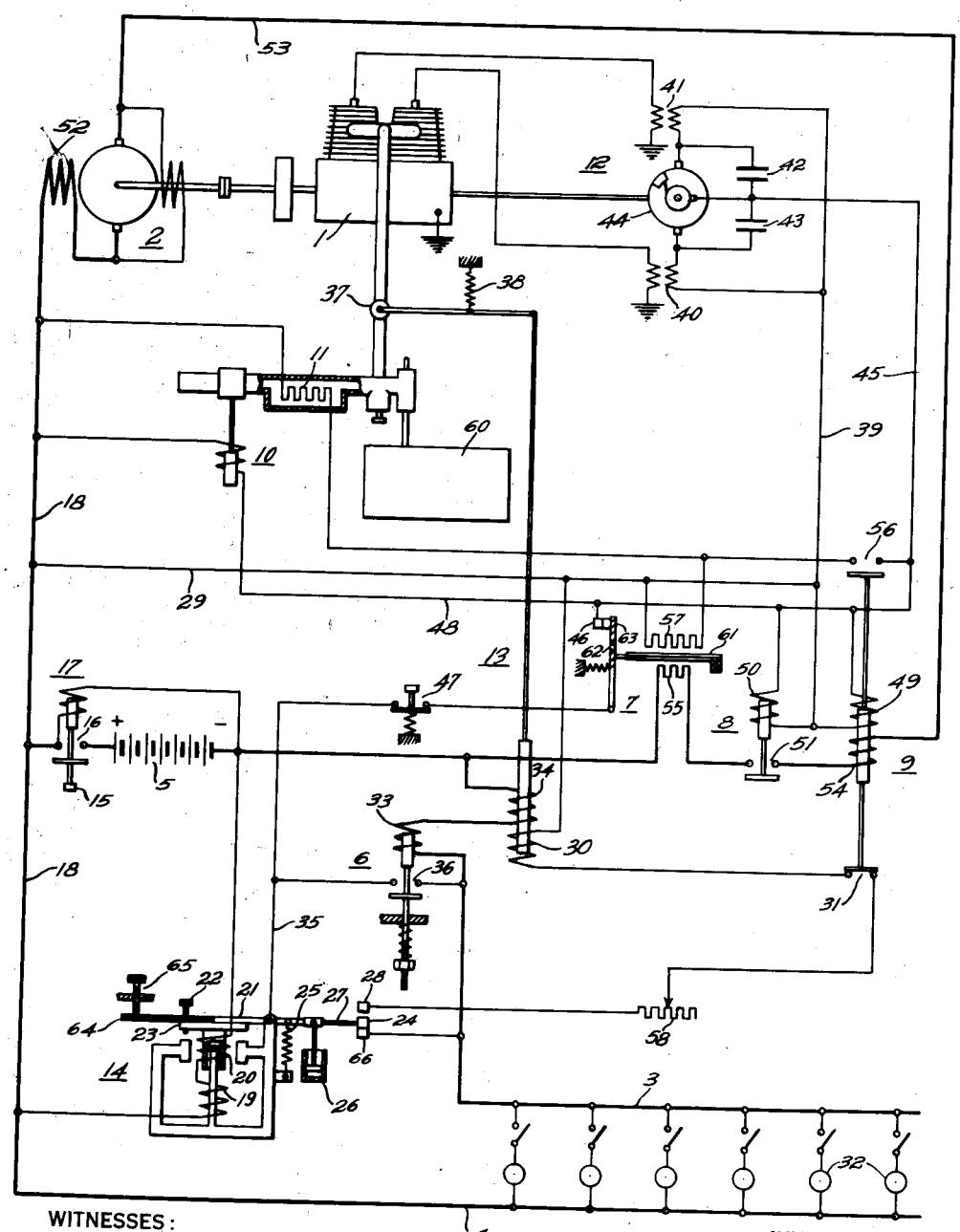
WITNESSES:
C. J. Weller.
Paul E. Friedemann
INVENTOR
Leo C. Frank.
BY
W. R. Coley
ATTORNEY Patented Feb. 23, 1937

2,071,826

UNITED STATES PATENT OFFICE 2,071,826

BATTERY CHARGE CONTROL FOR SMALL POWER PLANTS

Leo C. Frank, Irwin, Pa., assignor to Westinghouse Electric & Manufacturing Company, East Pittsburgh, Pa., a corporation of Pennsylvania Application June 14, 1934, Serial No. 730,627

4 Claims. (Cl. 290—30)

This invention relates generally to control systems for electric power plants for use in isolated places such as airplane beacons, farms, or similar service.

More particularly, this invention relates to automatic electric generating systems including, among other elements, a battery, an engine, a dynamo electric machine and load circuits, and suitable for use in isolated places, such as country residences, farm homes, places where the attendant is partially or totally unskilled in operating such plants, or generating plants for airplane beacons, which are often in very isolated places and where the attendant, whether skilled or unskilled, merely makes periodic inspection of the plants to provide the necessary oil and gasoline.

An object of this invention is the provision of an electric power plant, which shall be simple in construction, automatic and efficient in operation and which may be readily installed.

Another object of this invention is to provide in a simple manner for protection against under voltage, overload, and continued cranking when the engine fails to start.

Other objects of this invention are to provide for automatic starting of the engine when the load on the line exceeds a predetermined value, and for automatic stopping of the engine when the loading on the line decreases to a predetermined value, and for controlling the fuel supply to the engine during the starting operation, to limit the fuel to an amount proportional to the current in the load line and control circuits.

In power systems of the type hereinbefore indicated and described more in detail hereinafter, the application of a load will actuate the starting sequence of the plant whereupon there is a rapid discharge of the battery into the armature of the dynamo-electric machine, then operating as a motor, which naturally causes a considerable drop in the voltage of the battery, especially if the specific gravity of the liquid in the battery be low. Since one of the principal functions of the battery is to get the automatic plant started, it is important that the voltage during the starting period be maintained above a given value.

Assuming that the system herein disclosed is a 32 volt system, it is generally permissible to have a minimum of 20 volts during the heavy current demand while starting. In such a case, a relay may be provided to operate at approximately 22 to 23 volts so as to change the charging rate of the battery from a given slow or trickle charge to a more rapid charging rate.

An important object of this invention is to provide for automatically selectively charging the battery of the generating system, either slowly or rapidly as desired.

A more specific object, relating to the charging of the battery, is the provision of a relay responsive to the battery voltage during the starting period to control the engine speed, after it has started and assumed its load, to provide a rapid rate of charging for the battery if the battery during such starting period has a voltage below a selected value and responsive to the voltage of the battery when fully charged to prevent an increase of engine speed and thus an increase of the charging rate of the battery.

Other objects and advantages will become more apparent from a study of the following specification, especially when taken in conjunction with the accompanying drawing, wherein the single figure shows diagrammatically the various elements of this invention in operative relation.

In the drawing representing the automatic electric generating system, an internal combustion engine 1 is coupled to a dynamo electric machine 2 which machine may be operated as a generator to supply energy to a pair of load lines or circuits 3 and 4 and a battery 5, or be operated as a motor from the battery 5 to crank the engine 1.

To properly control the energy to be supplied to the load lines 3 and 4, a master relay 6 is interconnected with the load lines and is adapted to control the starting of the engine when the load on the lines exceeds a given value. When the load on the lines is less in value than this given value, the battery alone supplies the needed energy.

To prevent continued cranking of the engine should the engine fail to start during the starting cycle, a thermostatic cranking cutout relay 7 is provided which controls the starting circuit for the dynamo-electric machine to disconnect this machine from the battery should the engine fail to start.

Generally stated, when the load on the load lines 3 and 4 exceeds a given value, the master relay 6 operates thereby establishing circuits for the operating coil of the generator contactor 8, the shunt coil of the reverse current relay 9, the coil for the choke 10, the heater 11, the heaters for the thermostatic cranking cutout relay 7, the ignition circuit 12 for the engine 1, and a circuit for the shunt coil of the governor 13. The shunt coil of the governor 13 is also controlled by a voltage relay 14 which relay constitutes an important addition to the system of control herein disclosed.

A better understanding of the novel features of this invention may be had from a study of the operation of the illustrated system during starting and normal operations when the load in the load lines is below a certain value and also when the load in the load lines is above a certain value.

Assuming that the battery 5 is fully charged, as would be the case for a new plant at the time of installation, and the power plant is installed ready for operation, the attendant may thus actuate the reset handle 15 to close the contact members 16 of the low-voltage protective relay 17. It will be noted that the coil of the low-voltage protective relay 17 is connected directly across the terminals of the battery 5 but outside of the contact member 16. It is, therefore, clear that the coil of relay 17 cannot be energized except the contact members 16 be manually closed and, furthermore, if the voltage of the battery becomes very low, namely, but a small fraction of its normal voltage or the cells of the battery have become damaged so that there be a short-circuit in the battery, the actuating coil of the relay 17 will be deenergized and contact members 16 opened. The plant will thus cease to operate and the attendant must manually reset the relay 17 to again effect its operation.

When the contact members 16 have been closed as heretofore indicated, a circuit is established from the left-hand terminal of the battery 5, which may be designated the positive terminal, through the contact members 16, conductor 18, stationary coil 19 of the relay 14, and movable coil 20 of the relay 14 to the right-hand terminal of the battery 5.

The relay 14 has its movable coil 20 disposed in the path of the magnetic flux of the magnetic circuit in such a way that the armature lever 21 will be rotated in a counter-clockwise direction to complete the magnetic circuit. However, this relay is provided with a brass screw 22 for adjusting the air gap and thus adjusting the drop out value of this relay. When coils 19 and 20 are deenergized, the armature 23 and thus the contact member 24 will be in the position indicated in the figure. However, for a normal voltage of the battery, namely, a fully charged battery, as has been assumed, the armature will move against the action of the spring 25 and will be controlled in its speed of operation by the dampening device or dashpot 26. The contact member 24 is mounted on a spring 27 and is thus adapted to make contact at the contact member 28 before the armature 23 has moved to substantially complete the magnetic circuit of the relay 14.

Since the relay 14 is energized by the circuit traced, contact member 24 makes contact with a contact segment 28. As long as the battery supplies the energy needed by the current-consuming devices 32 and if such energy does not exceed a given value, no circuit is completed by the closing or the engagement of the contact members 24 and 28, since the master relay 6 would not under such conditions have operated. The utility of the relay 14 will become more apparent from a study of the starting cycle of the internal combustion engine.

The differential between the pull-in and drop-out voltage of relay 14 is such that this relay can, during starting, drop out to a position which will be maintained during running, until the battery voltage has risen to a value indicative of a fully charged condition of the battery.

It is well known of every relay having an air-gap that a higher voltage is required across its actuating coil or coils for it to pull-in and a much lesser current, namely, a much lower voltage across its actuating coil or coils is required for it to drop out.

Relay 14 drops out when the voltage of the battery during heavy loading, as is usual during the starting of the engine, drops to about 22 volts and pulls in when the battery voltage is somewhere in the neighborhood of 36 to 38 volts. A battery voltage of 38 volts is not an unusually high voltage for a 32 volt system and since the coils of relay 14 are connected almost directly across the battery terminals, it will, of course, have its magnetic circuit and the effect of the coils so designed that a mere manipulation of screw 22 will adjust the relay 14 for a pull-in at 36 or 38 volts and a drop-out at 22 volts.

If the battery voltage is not up to its desired value the relay 14, after having dropped out during starting, will remain out during running and provide for a rapid charging of the battery after the generator assumes its load.

For battery operation, the circuit for the load lines may be traced from the energized conductor 18, load line 4, current-consuming devices 32, load line 3, actuating coil 33 of the master relay 6, and series coil 34 of the governor 13 to the negative terminal of the battery. All of the other features of the system of control are not supplied with energy as long as the load on the load lines is below a predetermined value. The governor 13 has the spring 36 so positioned as to bias the throttle to the open position, but coils 30 and 34 are so connected and wound as to act in opposition to the spring 36. The governor thus operates as a function of the load on the line and the voltage of the battery when both coils 30 and 34 are energized.

If battery 5 is fully charged and thus has full voltage at its terminals, there is no need for rapid charging of the battery, and further, contact members 24 and 28 will be in engagement. As soon as the load increases sufficiently to operate master relay 6, the voltage of the battery is decreased or "pulled down" sufficiently to cause relay 14 to drop out thereby closing contact members 24 and 36. For motor operation of the dynamo-electric machine 2 and as long as the load on buses 3 and 4 is heavy enough for the master relay 6 to remain energized, the voltage of the battery remains low, and in consequence, relay 14 remains in the position indicated in the figure.

While the engine is still cold and has difficulty in attaining full operating speed and the dynamo-electric machine 2 has not yet assumed its load as a generator, the battery will be supplying the load which means that contact members 24—28 will be open. Coil 30 will, therefore, not become energized during starting and, in consequence, the position of the throttle 37 will be less affected than would be the case after energization of coil 30 takes place. By the combined action of throttle 37 and choke 10 the engine will be supplied with more fuel during starting than during running.

After the generator assumes the load and the battery is fully charged as assumed, contact members 24 and 28 close, thus energizing coil 30. The fuel supply is thus decreased; the speed of the engine is kept lower; and the voltage of the generator is lower to thus provide for only a trickle charge of the battery.

For a depleted battery, namely, a battery that has been depleted only to an extent such that its voltage decrease during starting will be about 22 volts, the coil 30 remains on open circuit after the generator assumes its load and in consequence the speed of the engine is kept higher to provide a higher charging rate for the battery. Further, the engine continues operating to maintain the higher charging rate even after the load is taken off the buses 3 and 4. When the battery has become fully charged relay 14 pulls in. If this happens under no-load conditions, the engine stops, but otherwise the engine keeps on running, supplying the load and a trickle charge to the battery. Thereafter, removal of the load stops the engine.

Going back to the engine starting cycle, if the load exceeds a predetermined value, master relay 6 will be caused to operate to close its contact members 36, whereupon a number of circuits are established. These circuits may be traced from the positively energized conductor 18 through conductor 29, shunt coil 30 of the governor 13, back contact members 31 of the reverse current relay 9, adjustable resistor 58, contact member 28 and contact member 24, conductor 35, contact members 36, actuating coil 33 of the master relay 6, and series coil 34 of the governor 13 to the negative terminal of the battery 5. The governor 13 is at all times biased to hold the throttle 37 in an open position by the spring 38. The energization of the coils 30 and 34 thus, both acting in opposition to spring 38, provides an opening for the throttle 37 proportional to the currents in these coils, namely, proportional to the load on the line and the voltage of the battery.

Another circuit is established from the positively energized conductor 29 through conductor 39, the primary winding of the induction coils 40 and 41 of the ignition system, the capacitors 42 and 43 and the interrupter 44, conductor 45, contact members 46 of the thermostatic cranking cutout relay 7, the stop switch 47, contact members 36 of the master relay 6, actuating coil 33 of the master relay 6, and actuating coil 34 of the governor 13 to the negative terminal of the battery.

The circuit will be closed at contact members 46 as long as the thermostatic relay 7 has not operated to open this circuit and, in consequence, the conductor 48 is negatively energized. The actuating coil of the choke 10 is thus connected across the conductors 18 and 48 (energized positively and negatively, respectively), and shunt coil 49 of the reverse current relay 9 is energized by the circuit traced from the positively energized conductor 18 through conductor 29 and actuating coil 49 to the negatively energized conductor 48. Similarly, coil 50 of the generator contactor is energized being connected directly across the conductors 29 and 48.

Energization of the coil 50 effects the closing of the contact members 51, thereby establishing a circuit from the positively energized conductor 18 through the series field 52 of the motor 2, the armature and shunt field of the motor 2 connected in parallel, conductor 53, series coil 54 of the reverse current relay 9, contact members 51, and heater 55 of the thermostatic relay 7 to the negative terminal of the battery 5. Since both coils 49 and 54 are energized additively, the reverse current relay is caused to operate to close the contact members 56, thereby establishing a circuit for the heater 11 and a second heater 57 for the thermostatic relay 7. The circuit for the heater 11 may be traced from the positively energized conductor 18 through the heater 11 and contact members 56 of the reverse current relay 9 to the negatively energized conductor 48. The circuit for the heater 57 may be traced from the positively energized conductor 29 through the heater 57, and contact members 56 to the negatively energized conductor 48.

To prevent the shunt coil 30 of the governor 13 from closing the throttle 37 too much during starting operation, the back contact members 31 of the reverse current relay 9 will, of course, have opened by the operation of this reverse current relay, whereby the engine is supplied with the requisite amount of fuel from the tank 60 during the starting operation.

If the engine should fail to start for any reason, the bimetal strip 61, being at this time heated by the heaters 55 and 57, of the thermostatic cranking cutout relay 7 will be deflected upwardly so that the end thereof passes through the aperture 62, whereupon the spring biased lever 63 will open the circuit at contact member 46, thereby disconnecting the ignition from the battery circuit and also deenergizing coils 50 and 49 to thus disconnect the dynamo electric machine, at this time operating as a motor, from the battery 5, by the opening of the contact members 51. For any given cranking condition the cranking period will be some selected time interval. Normally, the system will start and as a consequence, the current will reverse in coil 54 of the reverse current relay 9, thereby opening the contact members 56 to disconnect the heater 11 and the heater 57. The heater 55 is, of course, connected in the circuit of the battery and also the generator and provides the usual overload protection in case the load on the load lines 3 and 4 is in excess of the capacity of the power plant, whereupon the cranking cutout relay or thermostatic relay 7 will operate in the same manner as if the engine had failed to start during the starting sequence.

To provide for automatically selectively charging the battery either rapidly or slowly, the relay 14 heretofore mentioned is connected to be responsive to the voltage of the battery 5 and if this voltage of the battery be below a selected value determined by the drop out value of the relay as adjusted by screw 22, the relay coils 19 and 20 will be unable to hold the contact members 24 and 28 in engagement because of the action of the spring 25. To provide for a flat voltage characteristic of the relay 14, it is provided with a thermostatic element 64 which is adapted to counteract the action of the spring 25 with a rise in ambient temperature, as well as a rise in the temperature of the coils 19 and 20. It is a well known fact that the windings of relays, usually consisting of copper wire, increase in their resistance with a rise in temperature. At a higher temperature, the relay would tend to drop out at a higher voltage value; thus the effect of the coils would be decreased or in other words, the effect of the spring 25 with reference to the coil would be increased. It is, therefore, desirable that the thermostatic element 64 be so positioned on the relay 14 that it is responsive to the temperature of the coils 19 and 20, thereby providing the controlling effect independent of the temperature of the relay and solely dependent upon the voltage of the battery during starting. The thermostatic

age of the generator, a plurality of control means for controlling the starting, stopping and normal operation of the engine, and temperature compensated control means connected to be responsive to the voltage of the battery when said battery is heavily loaded for controlling the circuit connection of said voltage coil whereby the battery may be caused to be charged either slowly or more rapidly depending solely upon the voltage of the battery when heavily loaded with reference to its voltage when not heavily loaded.

LEO C. FRANK.